(12) United States Patent
Ito

(10) Patent No.: US 8,176,215 B2
(45) Date of Patent: May 8, 2012

(54) SEMICONDUCTOR MEMORY DEVICE AND CONTROL METHOD FOR SEMICONDUCTOR MEMORY DEVICE

(75) Inventor: Takafumi Ito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/178,681

(22) Filed: Jul. 8, 2011

(65) Prior Publication Data

US 2011/0264826 A1      Oct. 27, 2011

Related U.S. Application Data

(62) Division of application No. 12/357,691, filed on Jan. 22, 2009, now Pat. No. 8,055,808.

(30) Foreign Application Priority Data

Jan. 25, 2008    (JP) .................................. 2008-015253

(51) Int. Cl.
    *G06F 3/00*      (2006.01)
(52) U.S. Cl. ................... 710/14; 710/8; 710/10; 710/74
(58) Field of Classification Search ........................ None
    See application file for complete search history.

(56) References Cited

U.S. PATENT DOCUMENTS

| | | | |
|---|---|---|---|
| 7,370,168 B2 | 5/2008 | Kanamori et al. | |
| 2003/0065834 A1 | 4/2003 | Yuzawa et al. | |
| 2006/0026332 A1* | 2/2006 | Yen | 710/313 |
| 2006/0224819 A1 | 10/2006 | Ito | |
| 2006/0230250 A1 | 10/2006 | Klint et al. | |
| 2007/0005923 A1 | 1/2007 | Ito | |
| 2011/0022719 A1 | 1/2011 | Anderson et al. | |

* cited by examiner

*Primary Examiner* — Eron J Sorrell
(74) *Attorney, Agent, or Firm* — Oblon, Spivak, McClelland, Maier & Neustadt, L.L.P.

(57) ABSTRACT

A memory card capable of connecting to a host device includes a flash memory, a host interface unit which transfers data between a host device and the memory card, and a transfer mode control unit which changes a data transfer mode based on a command from the host device. The transfer mode control unit outputs status data containing an error code to the host device if a transfer mode change command is inputted from the host device, instructing the memory card to change to a transfer mode not supported by the host interface unit of the memory card.

11 Claims, 15 Drawing Sheets

FIG.2

| PIN NO | SD | | SPI |
|---|---|---|---|
| | 1-BIT | 4-BIT | 1-BIT |
| 1 | CARD DETECTION (CD) | CARD DETECTION/DATA (CD/DAT3) | CARD SELECTION (CS) |
| 2 | COMMAND/RESPONSE (CMD/RES) | COMMAND/RESPONSE (CMD/RES) | HOST TRANSMIT COMMAND & DATA (D1) |
| 3 | GROUND VOLTAGE (VSS1) | GROUND VOLTAGE (VSS1) | GROUND VOLTAGE (VSS1) |
| 4 | SUPPLY VOLTAGE (VDD) | SUPPLY VOLTAGE (VDD) | SUPPLY VOLTAGE (VDD) |
| 5 | CLOCK SIGNAL (CLK) | CLOCK SIGNAL (CLK) | CLOCK SIGNAL (SCLK) |
| 6 | GROUND VOLTAGE (VSS2) | GROUND VOLTAGE (VSS2) | GROUND VOLTAGE (VSS2) |
| 7 | DATA (DAT0) | DATA (DAT0) | CARD TRANSMIT COMMAND & DATA (D0) |
| 8 | | DATA (DAT1) | RSV |
| 9 | | DATA (DAT2) | RSV |

FIG.10

| | CHANGE FROM | | | | | | |
|---|---|---|---|---|---|---|---|
| | NORMAL SPEED MODE (NSM) | | | HIGH SPEED MODE (HSM) | | | ULTRA HIGH SPEED MODE (UHSM) |
| | SD | SD | SPI | SD | SD | SPI | SD |
| CHANGE TO | 1-BIT | 4-BIT | | 1-BIT | 4-BIT | | 4-BIT |
| NSM-SD 1-BIT | NONE | IMPOSSIBLE | NONE | NONE | IMPOSSIBLE | NONE | IMPOSSIBLE |
| NSM-SD 4-BIT | — | — | | | POSSIBLE | | POSSIBLE |
| NSM-SPI | | IMPOSSIBLE | | | IMPOSSIBLE | | IMPOSSIBLE |
| NSM-SD 1-BIT | | IMPOSSIBLE | | | IMPOSSIBLE | | IMPOSSIBLE |
| NSM-SD 4-BIT | | POSSIBLE | | | — | | POSSIBLE |
| NSM-SPI | | IMPOSSIBLE | | | IMPOSSIBLE | | IMPOSSIBLE |
| UHSM | | POSSIBLE | | | POSSIBLE | | — |

FIG.14A

COMMAND PARAMETER (24-BIT) TO SWITCH COMMAND

| ANOTHER PARAMETER | ANOTHER PARAMETER | ANOTHER PARAMETER | BUS VOLTAGE MODE | ANOTHER PARAMETER | BUS ACCESSES MODE |
|---|---|---|---|---|---|

BUS ACCESS MODE:  0 · · · NORMAL SD (NM)
                               1 · · · HIGH SPEED MODE (HSM)
                               2 · · · ULTRA HIGH SPEED MODE (UHSM)

BUS VOLTAGE MODE:  0 · · · 3.3V MODE
                                  1 · · · 1.8V MODE

FIG.14B

STATUS REGISTER DATA (512-BIT) IN RESPONSE TO SWITCH COMMAND

| OTHER PARAMETERS | | | | | |
|---|---|---|---|---|---|
| ANOTHER PARAMETER | ANOTHER PARAMETER | ANOTHER PARAMETER | BUS VOLTAGE MODE | ANOTHER PARAMETER | BUS ACCESSES MODE |
| OTHER PARAMETERS | | | | | |

BUS ACCESS MODE:  0 · · · NORMAL SD (NM)
                               1 · · · HIGH SPEED MODE (HSM)
                               2 · · · ULTRA HIGH SPEED MODE (UHSM)
                            0xF · · · NON-CHANGEABLE

BUS VOLTAGE MODE:  0 · · · 3.3V MODE
                                  1 · · · 1.8V MODE
                               0xF · · · NON-CHANGEABLE

FIG.15A

COMMAND PARAMETER (24-BIT) TO SWITCH COMMAND

| ANOTHER PARAMETER | ANOTHER PARAMETER | ANOTHER PARAMETER | ANOTHER PARAMETER | ANOTHER PARAMETER | BUS ACCESSES MODE/BUS VOLTAGE MODE |
|---|---|---|---|---|---|

BUS ACCESS MODE / BUS VOLTAGE MODE

0 · · · NORMAL SD (NM) / 3.3V
1 · · · HIGH SPEED MODE (HSM) / 3.3V
2 · · · NORMAL SD (NM) / 1.8V
3 · · · HIGH SPEED MODE (HSM) / 1.8V
4 · · · ULTRA HIGH SPEED MODE (UHSM)

FIG.15B

STATUS REGISTER DATA (512-BIT) IN RESPONSE TO SWITCH COMMAND

| OTHER PARAMETERS | | | | | |
|---|---|---|---|---|---|
| ANOTHER PARAMETER | ANOTHER PARAMETER | ANOTHER PARAMETER | ANOTHER PARAMETER | ANOTHER PARAMETER | BUS ACCESSES MODE/BUS VOLTAGE MODE |
| OTHER PARAMETERS | | | | | |

BUS ACCESS MODE / BUS VOLTAGE MODE

0 · · · NORMAL SD (NM) / 3.3V
1 · · · HIGH SPEED MODE (HSM) / 3.3V
2 · · · NORMAL SD (NM) / 1.8V
3 · · · HIGH SPEED MODE (HSM) / 1.8V
4 · · · ULTRA HIGH SPEED MODE (UHSM)
0xF · · · NON-CHANGEABLE

SEMICONDUCTOR MEMORY DEVICE AND CONTROL METHOD FOR SEMICONDUCTOR MEMORY DEVICE

CROSS REFERENCE TO RELATED APPLICATION

This application is a division of and claims the benefit of priority under 35 U.S.C. §120 from U.S. Ser. No. 12/357,691 filed Jan. 22, 2009, and claims the benefit of priority under 35 U.S.C. §119 from Japanese Application No. 2008-015253 filed Jan. 25, 2008, the entire contents of each of which are incorporated herein by reference.

BACKGROUND OF THE INVENTION

1. Field of the Invention

The present invention relates to a semiconductor memory device equipped with a semiconductor memory unit and, more particularly, to a semiconductor memory device equipped with a transfer mode control unit which changes a transfer mode for data transfer to/from a host device.

2. Description of the Related Art

Recently, semiconductor memory device such as flash memory cards which are non-volatile semiconductor storage media have been developed and put into widespread use as external storage devices for information devices such as digital cameras which are host devices. With increases in amounts of data handled by the host devices, flash memories have been growing in packaging density and storage capacity.

NAND-type flash memory, which features large storage capacity, is a type of flash memory which has recently been used particularly widely.

With the NAND-type flash memory, charge injected from a channel to a charge storage layer via an insulating film by means of a tunnel current is used as a digital bit information storage unit and information is read out by measuring conductance changes of a field-effect transistor based on the amount of charge. Unlike a DRAM, data can be read from the NAND-type flash memory multiple times without data corruption.

High read and write speed is required of semiconductor memory device, requiring a high bus transfer rate of a transfer bus. Therefore, for example, high speed specification is prescribed for a memory card bus with its transfer clock frequency raised from 25 MHz of normal mode to 50 MHz of high speed mode, enabling a higher data transfer rate.

Furthermore, for a higher data transfer rate, Japanese Patent Application Laid-Open Publication No. 2007-11788 discloses a memory card which provides an ultra-high speed mode capable of obtaining twice the data transfer rate using the same clock frequency as a high speed mode by transmitting and receiving data in sync with rising edges and falling edges of a clock signal supplied from a host device.

Memory cards have been designed to support various transfer modes, prescribed in advance, for data transfer with host devices. For example, the SD Memory Card (registered trademark) standard (SD standard) provides an SD mode and SPI mode. The SD mode further includes a 1-bit mode and 4-bit mode to accommodate different data transfer bus widths. Furthermore, each of the above modes includes a normal mode, high speed mode, and ultra-high speed mode which differ in the transfer rate.

The memory cards which support various transfer modes are convenient for users. However, complex control strategies are required to perform control in all the transfer modes. Also, the memory cards may become larger and more complex. On the other hand, a memory card which does not support transfer modes prescribed in advance is not convenient for the user because when trying to start data transfer in a transfer mode not supported by the host device, the memory card may cause errors such as a freeze-up.

Incidentally, there is a method which increases the transfer clock frequency of the memory card to increase the data transfer rate. However, increases in the transfer clock frequency can result in the need to shield spurious radiation of electromagnetic waves, i.e., take measures for EMI (Electro Magnetic Susceptibility). Also, increases in the transfer clock frequency will cause increases in power consumption of the memory card.

SUMMARY OF THE INVENTION

According to one aspect of the present invention, there is provided a semiconductor memory device capable of connecting to a host device, including: a semiconductor memory unit; a host interface unit configured to perform data transfer with the host device and compatible with a plurality of transfer modes obtained by combining one of a plurality of transfer bus width modes and one of a plurality of transfer clock modes; and a transfer mode control unit configured to output an error code to the host device if a transfer mode change command is inputted from the host device, instructing the semiconductor memory device to change to a first of the transfer clock modes not supported by the host interface unit in a first of the transfer bus width modes, when the host interface unit is in the first transfer bus width mode.

According to another aspect of the present invention, there is provided a control method for a semiconductor memory device, including: receiving, from a host device connected with, a transfer mode change command instructing the semiconductor memory device to change at least one of a transfer bus width mode and a transfer clock mode in a transfer mode which is a combination of one of a plurality of transfer bus width modes and one of a plurality of transfer clock modes; and outputting an error code to the host device if the received transfer mode change command instructs the semiconductor memory device to change to a first of the transfer clock modes not supported by a host interface unit in a first of the transfer bus width modes when the host interface unit is in the first transfer bus width mode.

BRIEF DESCRIPTION OF THE DRAWINGS

FIG. 2 is a table showing functions of a connector of the memory card according to the first embodiment;

FIG. 10 is a table illustrating transfer modes of the memory card according to the first embodiment;

FIG. 14A is an explanatory diagram showing a command protocol used to issue a switch command;

FIG. 14B is an explanatory diagram showing a command protocol used to issue a switch command;

FIG. 15A is an explanatory diagram showing a command protocol used to issue a switch command; and FIG. 15B is an explanatory diagram showing a command protocol used to issue a switch command.

DETAILED DESCRIPTION OF THE PREFERRED EMBODIMENTS

First Embodiment

A memory card 100 which is a semiconductor memory device according to a first embodiment of the present invention will be described below with reference to the drawings.

Figure 1:
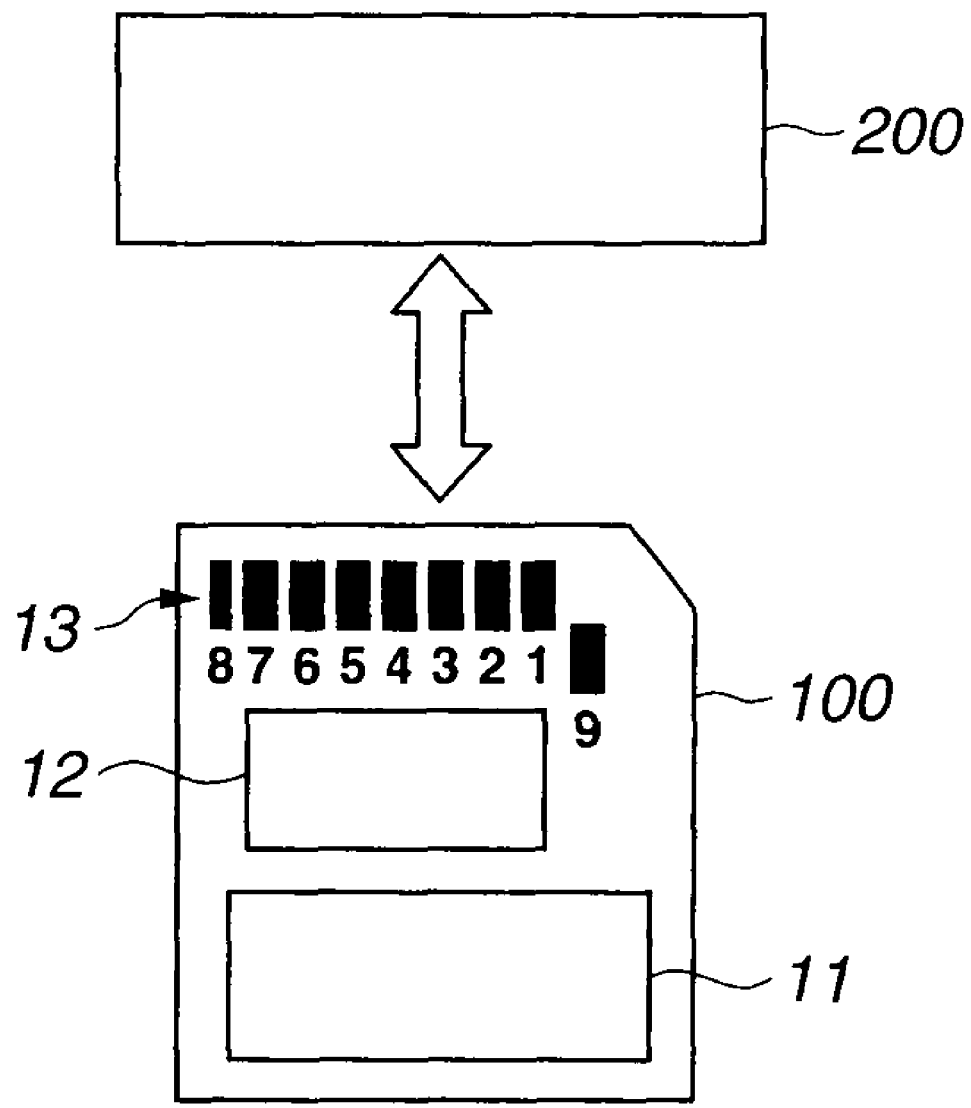
FIG. 1 is a schematic diagram showing a relationship between a memory card and host device according to a first embodiment.
Figure 3:
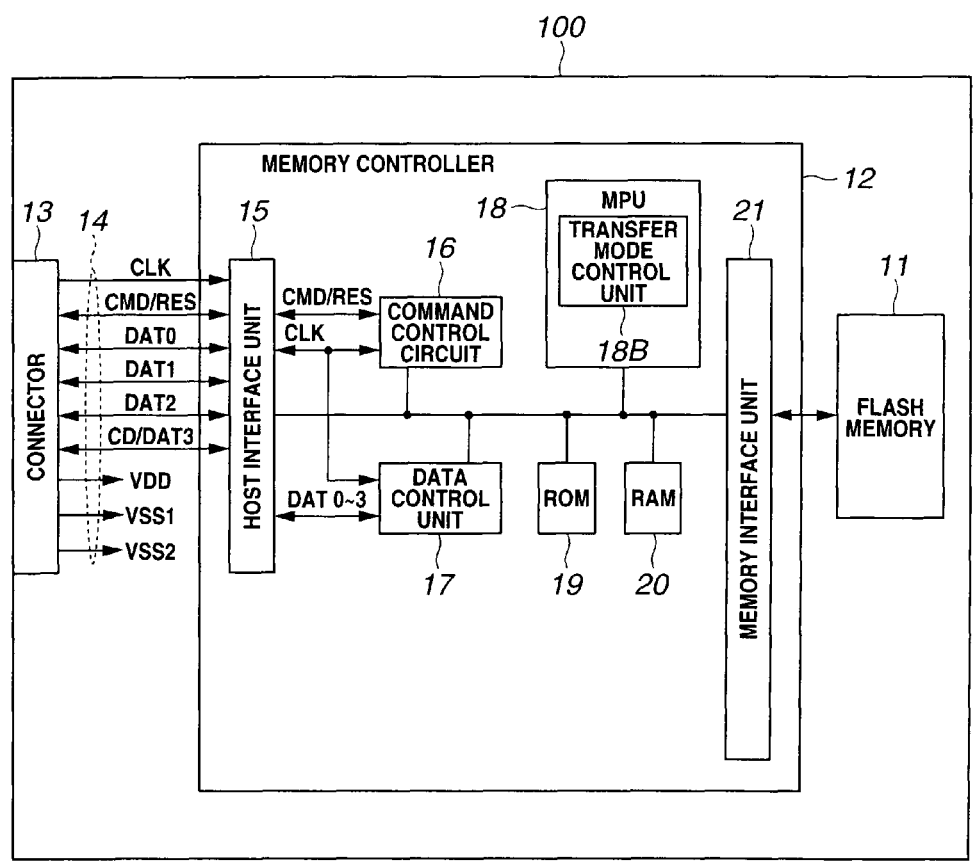
FIG. 3 is a block diagram showing a configuration of the memory card according to the first embodiment.

FIG. 1 is a schematic diagram showing a relationship between the memory card 100 and a host device 200. FIG. 2 is a table showing functions of a connector of the memory card 100. FIG. 3 is a block diagram showing a configuration of the memory card 100.

As shown in FIG. 1, the memory card 100 is an SD Memory Card (registered trademark) compliant with the SD standard and is used as an external storage device of a host device 200, being inserted in the host device 200. Examples of the host device 200 include a personal computer which processes various data such as image data and music data, digital camera, and other information processing apparatus.

The memory card 100 exchanged data with the host device 200. The memory card 100 includes a flash memory 11 which is a semiconductor memory unit, a memory controller 12 which controls the flash memory 11 and the like, and a connector 13 (including pin 1 to pin 9).

When the memory card 100 is mounted on the host device 200, the connector 13 is electrically connected to the host device 200. Signals are assigned to pins 1 to 9 included in the connector 13, for example, as shown in FIG. 2. In FIG. 2, SD modes (1-bit and 4-bit) and SPI mode are data transfer operation modes prescribed by the SD Memory Card (registered trademark) standard, as described later.

Data DAT0, DAT1, DAT2, and DAT3 are assigned to pins 7, 8, 9, and 1, respectively. Pin 1 is also assigned to a card detection signal CD. A command CMD and a response RES which is a response signal to the command CMD from the memory card 100 are assigned to pin 2. A clock signal CLK is assigned to pin 5. A supply voltage VDD, ground voltage VSS1, and ground voltage VSS2 are assigned to pins 4, 3, 6, respectively.

Next, referring to FIG. 3, the flash memory 11, which is a non-volatile semiconductor memory, is made up of a plurality of NAND-type flash memories. Data and the like transmitted from the host device 200 are stored in the flash memory 11.

The connector 13 is also connected to the memory controller 12 via a bus 14. The bus 14 includes a CLK line, a CMD/RES line, a DAT0 line, a DAT1 line, a DAT2 line, a CD/DAT3 line, a VDD line, a VSS1 line, and a VSS2 line. The memory controller 12 is connected to the flash memory 11 via a bus, for example, 8 bit wide.

As described above, regarding data transfer operation modes (hereinafter also referred to as "transfer modes") of the memory card 100 which is an SD Memory Card (registered trademark), the SD mode and SPI mode have been prescribed. Regarding the SD mode, two modes have been further prescribed: 1-bit mode which uses only data DAT0 and 4-bit mode which uses data DAT0 to DAT3. Incidentally, depending on transfer clock frequency or the like, the transfer modes of the memory card 100 includes normal speed mode (hereinafter also referred to as "NSM") which uses a normal transfer rate, high speed mode (hereinafter also referred to as "HSM") which uses a transfer rate twice the NSM, and ultra-high speed mode (hereinafter also referred to as "UHSM") which uses a transfer rate twice the HSM. These modes will be described later.

The SD mode (SD 4-bit mode) which performs data transfer using a 4-bit bus width uses all the four pins 1, 7, 8, and 9 for the data transfer. On the other hand, in the SD mode (SD 1 bit mode) which performs data transfer using a 1-bit bus width uses only pin 7, and does not use pins 8 and 9 for data transfer. Also, pin 1 is prescribed to be used for asynchronous interrupts to the host device 200, for example, from the memory card 100.

In the SPI mode, which performs data transfer using a 1-bit bus width, pin 7 is used as a data signal line (DATAOUT) from the memory card 100 to the host device 200. Pin 2 is used as a data signal line (DATAIN) from the host device 200 to the memory card 100. Pins 8 and 9 are not used. Also, in the SPI mode, pin 1 is prescribed to be used for transmission of a chip select signal from the host device 200 to the memory card 100.

Determination as to which of the SD mode and SPI mode will be used is made during initialization of the memory card 100. Also, selection between the 1-bit mode and 4-bit mode of the SD mode is made by a command (SET BUS WIDTH) from the host.

The memory controller 12 includes a host interface unit 15, a command control circuit 16, a data control unit 17, an MPU (Micro Processing Unit) 18, a ROM (Read Only Memory) 19, a RAM (Random Access Memory) 20, and a memory interface unit 21.

The host interface unit 15 is connected to the host device 200 via the connector 13. The host interface unit 15 is a functional block which transmits and receives commands, various data, and the like using a predetermined protocol under the control of the MPU 18 and a transfer mode control unit 18B.

The command control circuit 16 receives and interprets a command CMD transmitted from the host device 200. Also, the command control circuit 16 generates a response RES, i.e., a response signal to the command CMD and transmits the response RES to the host device 200. Concrete operation of the command control circuit 16 will be described later.

The data control unit 17 transmits and receives data based on the commands CMD transmitted from the host device 200. Also, the data control unit 17 generates status data (STATUS) which indicates operating status and the like of the memory card 100 and transmits the status data to the host device 200. Concrete operation of the data control unit 17 will be described later.

The MPU 18 controls operation of the entire memory card 100. The transfer mode control unit 18B described later may be part of the MPU 18. When the memory card 100 is turned on, for example, the MPU 18 reads firmware (a control program) from the ROM 19 into the RAM 20, performs predetermined processing, and thereby creates various tables in the RAM 20. Also, the MPU 18 receives a write command, a read command, an erase command or the like and performs predetermined processing on the flash memory 11 or controls a data transfer process.

The ROM 19 is a memory which stores the control program and the like used by the MPU 18. The RAM 20, which is used as a working area by the MPU 18, is a memory for use to store the control program and various tables. The memory interface unit 21 is a functional block which performs an interface process between the memory controller 12 and flash memory 11.

Figure 4:
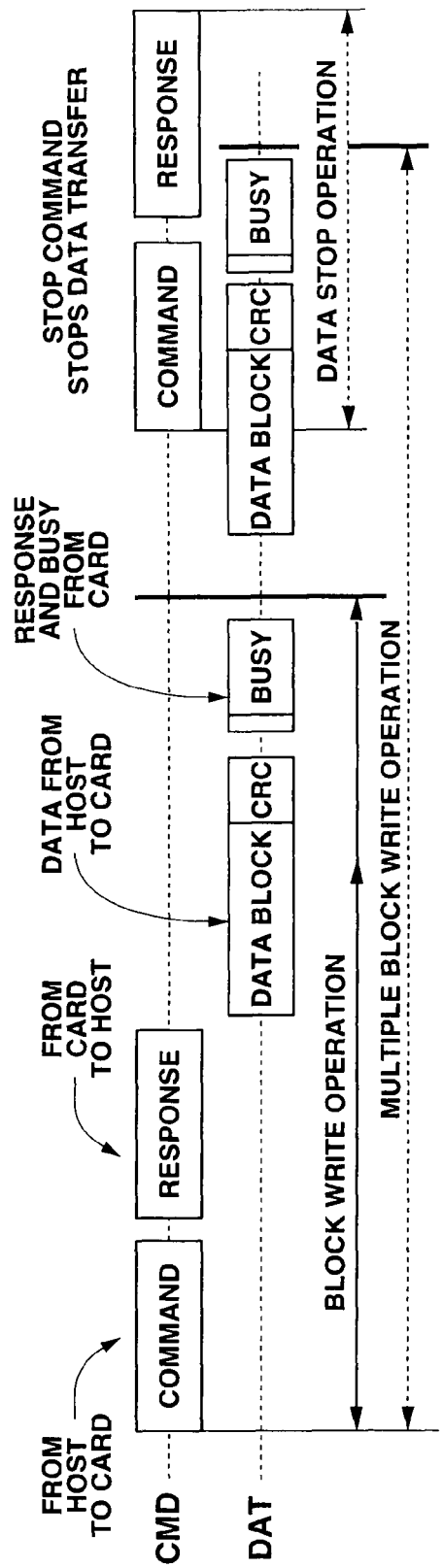
FIG. 4 is a timing chart showing a data write operation to the memory card according to the first embodiment.
Figure 5:
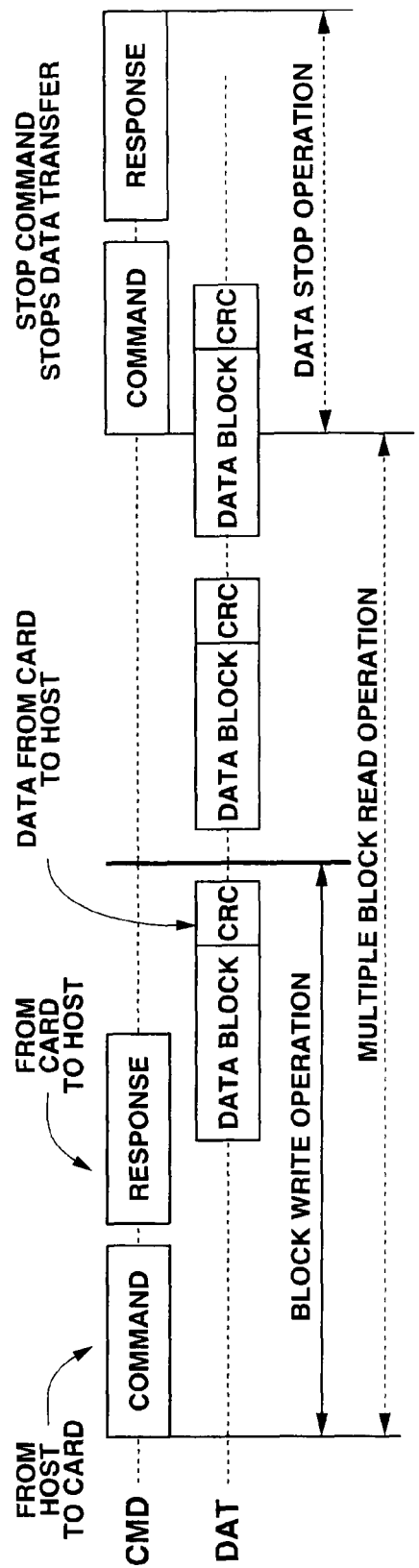
FIG. 5 is an explanatory diagram showing commands, data, and the like on a bus of the memory card according to the first embodiment.

Next, operation of the memory card 100 will be described with reference to FIGS. 4 and 5. First, a data write operation to the memory card 100 will be described. FIG. 4 is a timing chart showing a data write operation. Also, FIG. 4 is an explanatory diagram showing commands, data, and the like on the bus 14.

Data is transferred in units of a data block (e.g., 512 bytes). Each data block is transmitted with a 10-byte redundancy (RA) added. The redundancy (RA) includes a CRC (Cyclic Redundancy Check) code and the like used for error detection. The CRC code is generated by a CRC unit (not shown) of the memory controller 12. The CRC unit detects errors based on the CRC code.

Two types of data transfer are available: single-block data transfer which involves transferring data in units of a block and four-block data transfer which involves transferring data in units of multiple blocks. The present embodiment is described by taking a multiple block read operation and multiple block write operation as an example, but the present embodiment is also applicable to single-block data transfer.

First, to start a data write, the host device 200 transmits a write command (W-CMD) to the memory card 100. The memory card 100 receives the write command (W-CMD). The command control circuit 16 interprets the write command (W-CMD) and generates a response (RES) to the write command (W-CMD). The response (RES) is transmitted to the host device 200.

Next, the host device 200 transmits block data to the memory card 100. The command control circuit 16 generates a response (RES), acknowledging reception of the block data. Furthermore, the data control unit 17 writes the block data received from the host device 200 into the flash memory 11. Also, while writing the data into the flash memory 11, the data control unit 17 generates a low-level busy signal (busy). The busy signal (busy) is transmitted to the host device 200 via the DAT0 line.

Similarly, a multiple block write operation is performed to write multiple data blocks received from the host device 200.

Next, to stop the data write, the host device 200 transmits a stop command (S-CMD) to the memory card 100. The memory card 100 receives the stop command (S-CMD). Then, the command control circuit 16 interprets the stop command (S-CMD) and generates a response (RES) to the stop command (S-CMD). The response (RES) is transmitted to the host device 200. Consequently, the memory card 100 performs a data stop operation. Subsequently, the memory card 100 stops the data transfer.

Next, a data read operation from the memory card 100 will be described. FIG. 5 is a timing chart showing a data read operation. FIG. 5 shows commands, data, and the like on the bus 14.

First, to start a data read, the host device 200 issues and transmits a read command (R-CMD) to the memory card 100. The memory card 100 receives the read command (R-CMD). The command control circuit 16 interprets the read command (R-CMD), generates a response (RES) to the read command (R-CMD), and transmits the response (RES) to the host device 200.

Next, the data control unit 17 reads a data block out of the flash memory 11. The data block is transmitted to the host device 200. Similarly, a plurality of data blocks is transmitted to the host device 200.

Next, to stop the data read, the host device 200 transmits a stop command (S-CMD) to the memory card 100. The memory card 100 receives the stop command (S-CMD). Then, the command control circuit 16 interprets the stop command (S-CMD) and generates a response (RES) to the stop command (S-CMD). The response (RES) is transmitted to the host device 200. Consequently, the memory card 100 performs a data stop operation. Subsequently, the memory card 100 stops the data transfer.

Figure 6:
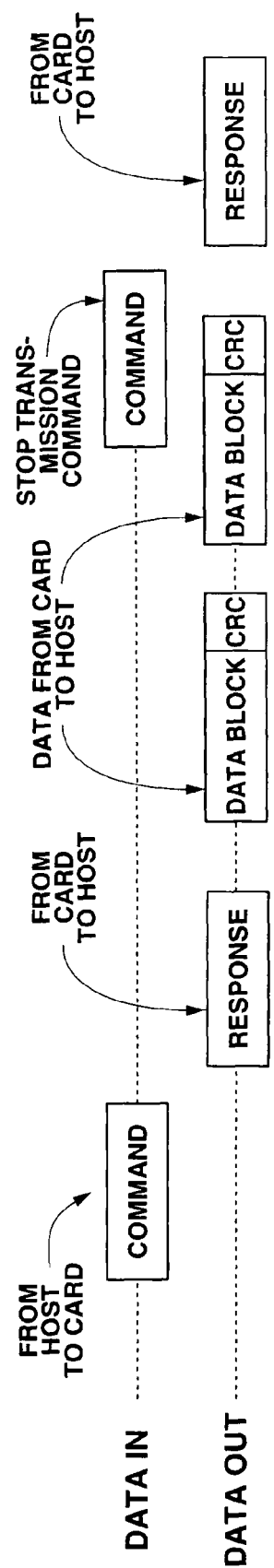
FIG. 6 is a diagram showing basic operations of a transfer protocol for a multiple block data read operation of the memory card according to the first embodiment.
Figure 7:
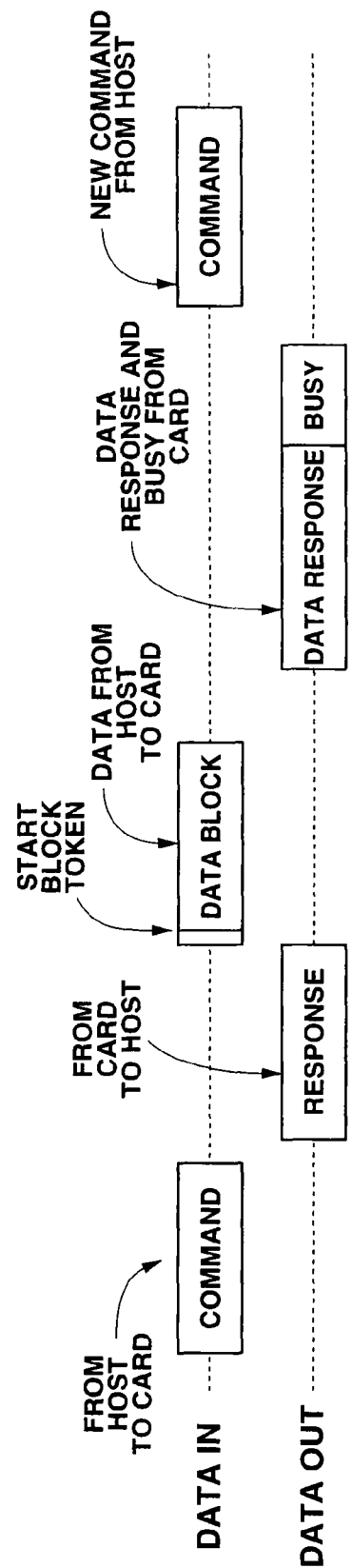
FIG. 7 is a diagram showing basic operations of a transfer protocol for a multiple block data write operation of the memory card according to the first embodiment.

FIGS. 6 and 7 are diagrams showing basic operations of a transfer protocol for the memory card 100 described above. FIG. 6 shows a multiple block read operation from the memory card 100 and FIG. 7 show a multiple block write operation to the memory card 100. Also, FIGS. 6 and 7 are timing charts showing a data read and write operations. Also, FIGS. 6 and 7 show commands, data, and the like on the bus 14.

Figure 8:
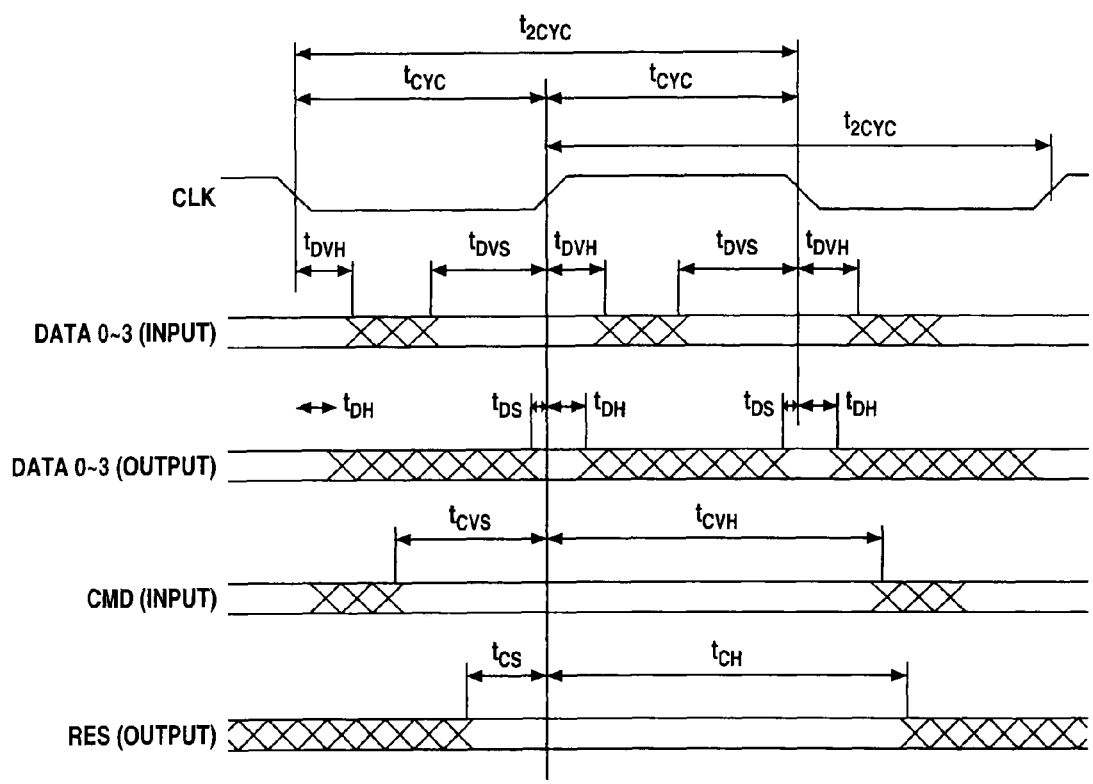
FIG. 8 is a timing chart showing data transfer and command/response transfer in double-edge mode of the memory card according to the first embodiment.
Figure 9:
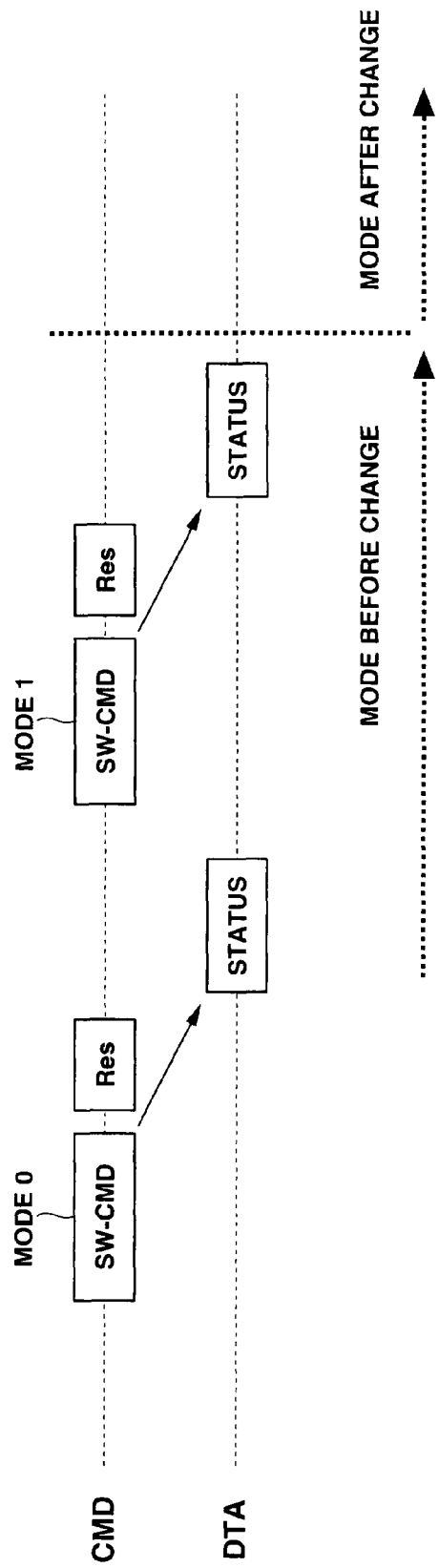
FIG. 9 is a timing chart illustrating a changeover from single-edge mode to double-edge mode of the memory card according to the first embodiment.

Next, a double-edge mode available in HSM and UHSM of the memory card 100 will be described with reference to FIGS. 8 and 9. FIG. 8 is a timing chart showing data transfer and command/response transfer in double-edge mode and FIG. 9 is a timing chart illustrating a changeover from single-edge mode to double-edge mode. Also, FIGS. 8 and 9 show commands, data, and the like on the bus 14. Incidentally, in FIG. 8, "$t_{CYC}$" denotes a clock cycle time.

The memory card 100 can perform data transfer in a double-edge transfer mode which uses both rising and falling edges of the clock signal CLK. On the other hand, command/response transfer is performed in a single-edge transfer mode which uses rising edges (or falling edges) of the clock signal CLK.

First, a write operation which involves data input from the host device 200 to the memory card 100 (DAT0 to DAT3 (input)) will be described. The host device 200 transmits data using both rising and falling edges of the clock signal CLK. In so doing, the host device 200 transfers the data in such a way as to satisfy a setup time $t_{DVS}$ and hold time $t_{DVH}$ according to a predetermined protocol. The data control unit 17 takes in the data transmitted from the host device 200 in double-edge transfer mode, using both rising and falling edges of the clock signal CLK. The host device 200 writes the data into the flash memory 11.

Next, a read operation which involves data output from the memory card 100 to the host device 200 (DAT0 to DAT3 (output)) will be described. The data control unit 17 transmits data using both rising and falling edges of the clock signal CLK. In so doing, the data control unit 17 transfers the data in such a way as to satisfy a setup time $t_{DS}$ and hold time $t_{DH}$ according to a predetermined protocol. The host device 200 takes in the data transmitted from the memory card 100 in double-edge transfer mode, using both rising and falling edges of the clock signal CLK.

Next, a command CMD transfer operation (CMD (input)) from the host device 200 to the memory card 100 will be described. The host device 200 issues a command CMD. The host device 200 transmits the command CMD to the memory card 100 using only rising edges of the clock signal CLK. In so doing, the host device 200 transfers the command CMD in such a way as to satisfy a setup time $t_{CVS}$ and hold time $t_{CVH}$ according to a predetermined protocol. The command control circuit 16 takes in the command CMD transmitted from the host device 200 in single-edge transfer mode, using only rising edges of the clock signal CLK.

Next, a response RES transfer operation from the memory card 100 to the host device 200 (RES (output)) will be described. The command control circuit 16 generates a response RES to the command CMD transmitted from the host device 200. Then, the command control circuit 16 transmits the response RES to the host device 200 using only rising edges of the clock signal CLK. In so doing, the command control circuit 16 transfers the response RES in such a way as to satisfy a setup time $t_{CS}$ and hold time $t_{CH}$ according to a predetermined protocol. The host device 200 takes in the response RES transmitted from the memory card 100 in single-edge transfer mode, using only rising edges of the clock signal CLK.

In this way, according to the present embodiment, a command and response are transferred using only rising edges of the clock signal CLK. On the other hand, data is transferred using both rising edges and falling edges of the clock signal CLK.

By performing data transfer and command/response transfer in this way, it is possible to use conventional units for CMD line signals which require complex processing and involve strict timing conditions. Also, it becomes easier to configure and mount the memory card. On the other hand, in the case of multiple block data transfer and the like for which a practical data transfer rate depends on the DAT0 to DAT3 lines, data can be transferred at a rate twice the clock signal CLK, improving the practical data transfer rate greatly. Incidentally, in the case of multiple block data transfer, the CMD line is used only to transfer the first command and response of the protocol, and the practical data transfer rate is not affected greatly even if the single-edge mode is used.

Changeover between single-edge mode and double-edge mode is made using a switch command (SW-CMD) issued by the host device 200 as shown in FIG. 9.

The switch command (SW-CMD) can have, for example, two modes corresponding to a CHECK function and SET function. For example, mode 0 corresponds to the CHECK function and mode 1 corresponds to the SET function. Changeover between mode 0 and mode 1 is made by setting a mode bit (not shown) to "0" or "1."

When the host device 200 accesses the memory card 100, the host device 200 needs to recognize what specifications the memory card 100 connected to the host device 200 is based on. Thus, the host device 200 supplies the switch command (SW-CMD) to the memory card 100 by setting the switch command (SW-CMD) to mode 0, i.e., the CHECK function, and recognizes the specifications of the memory card 100 based on the status data (STATUS) returned from the memory card 100.

If it turns out that the memory card 100 supports the double-edge mode, the host device 200 supplies the switch command (SW-CMD) to the memory card 100 by setting the switch command (SW-CMD) to mode 1, i.e., the SET function, to set the mode (double-edge mode, according to the present embodiment) of the memory card 100. Subsequently, the host device 200 transfers data to the memory card 100 in double-edge mode.

Next, transfer modes of the memory card 100 will be described with reference to FIG. 10. FIG. 10 is a table illustrating transfer modes of the memory card 100.

FIG. 10 shows how the transfer mode is changed when a mode change command is issued by the host device 200. That is, "Change From" means the current or initial mode of the memory card and "Change To" means the transfer mode after the change.

As described above, the memory card 100 supports normal speed mode (NSM), high speed mode (HSM), and ultra-high speed mode (UHSM) as transfer modes. In NSM, the transfer clock frequency is 25 MHz, but in HSM and UHSM, the transfer clock frequency is 50 MHz. Besides, in UHSM, operation is performed in double-edge mode at the transfer clock frequency of 50 MHz.

However, addition of UHSM transfer modes to the existing transfer modes will increase the types of transfer mode greatly. That is, as shown in FIG. 8, there are nine transfer modes: NSM-SD (1-bit), NSM-SD (4-bit), NSM-SPI, HSM-SD (1-bit), HSM-SD (4-bit), NSM-SPI, UHSM-SD (1-bit), UHSM-SD (4-bit), and UHSM-SPI. However, in UHSM, the memory card 100 supports only the 4-bit bus width transfer mode, and does not support the 1-bit bus width transfer modes (SPI mode and SD 1-bit mode). This is because UHSM is intended for very fast transfer, making the SPI mode and SD 1-bit mode meaningless, and development of a memory card controller would incur unnecessary development cost and verification cost and complicate the memory card.

To change among the NSM, HSM, and UHSM transfer modes, a switch command (SW-CMD) is issued to the memory card 100. Upon receiving the switch command (SW-CMD) (receiving a transfer mode change command), the command control circuit 16 of the memory card 100 transmits a response RES to the host device 200 in sync with rising edges of the clock signal CLK.

Furthermore, based on the switch command (SW-CMD), the command control circuit 16 sets the memory card 100 to any one of the transfer modes: NSM, HSM, and UHSM (changing a current transfer mode). The data control unit 17 transmits status data (STATUS) to the host device 200 via a DAT line, acknowledging reception of the transfer mode change command.

When the memory card 100 is in SPI mode or SD 1-bit mode (first transfer bus width mode+first transfer clock mode), if a switch command is issued by the host device 200, instructing the memory card 100 to switch to UHSM (SPI mode or SD 1-bit mode) (first transfer bus width mode+ second transfer clock mode) (IMPOSSIBLE in FIG. 10), the transfer mode control unit 18B outputs status data to the host device 200 via a bus of a 1-bit bus width (SPI mode or SD 1-bit mode), the status data containing an error code which indicates that no transfer mode change has been made (outputting an error code). Reception of the status data containing the error code allows the host device 200 to recognize that the memory card 100, and thus the host interface unit 15, does not support the specified transfer mode. Consequently, the host device 200 can take measures such as changing to another transfer mode, thereby avoiding errors such as a freeze-up. Thus, the memory card 100 features high transfer rates and convenience for the user. Furthermore, the memory card 100 is easy to control and does not cause increases in complexity and size.

Second Embodiment

Next, a memory card 100B according to a second embodiment of the present invention will be described. Configuration and the like of the memory card 100B are similar to those of the memory card 100 according to the first embodiment. Thus, the same components as the first embodiment will be denoted by the same reference numerals as the corresponding components in the first embodiment, and description thereof will be omitted.

When the memory card 100 is in SD 1-bit mode (first transfer bus width mode+first transfer clock mode), if a switch command is issued by the host device 200, instructing the memory card 100 to change to a UHSM transfer mode (first transfer bus width mode+second transfer clock mode) (receiving a transfer mode change command), the transfer mode control unit 18B of the memory card 100 outputs status data to the host device 200, the status data containing an error code which indicates that no transfer mode change has been made (outputting an error code). In contrast, when the memory card 100B is in SD 1-bit mode (first transfer bus width mode+first transfer clock mode), if a switch command is issued by the host device 200, instructing the memory card 100B to change to a UHSM transfer mode (first transfer bus width mode+second transfer clock mode), the transfer mode control unit 18B changes to a UHSM 4-bit bus width transfer mode (second transfer bus width mode+second transfer clock mode) which is a combination of a 4-bit bus width mode and 50-MHz clock mode supported by the host interface unit 15 (changing a current transfer mode).

Figure 11:
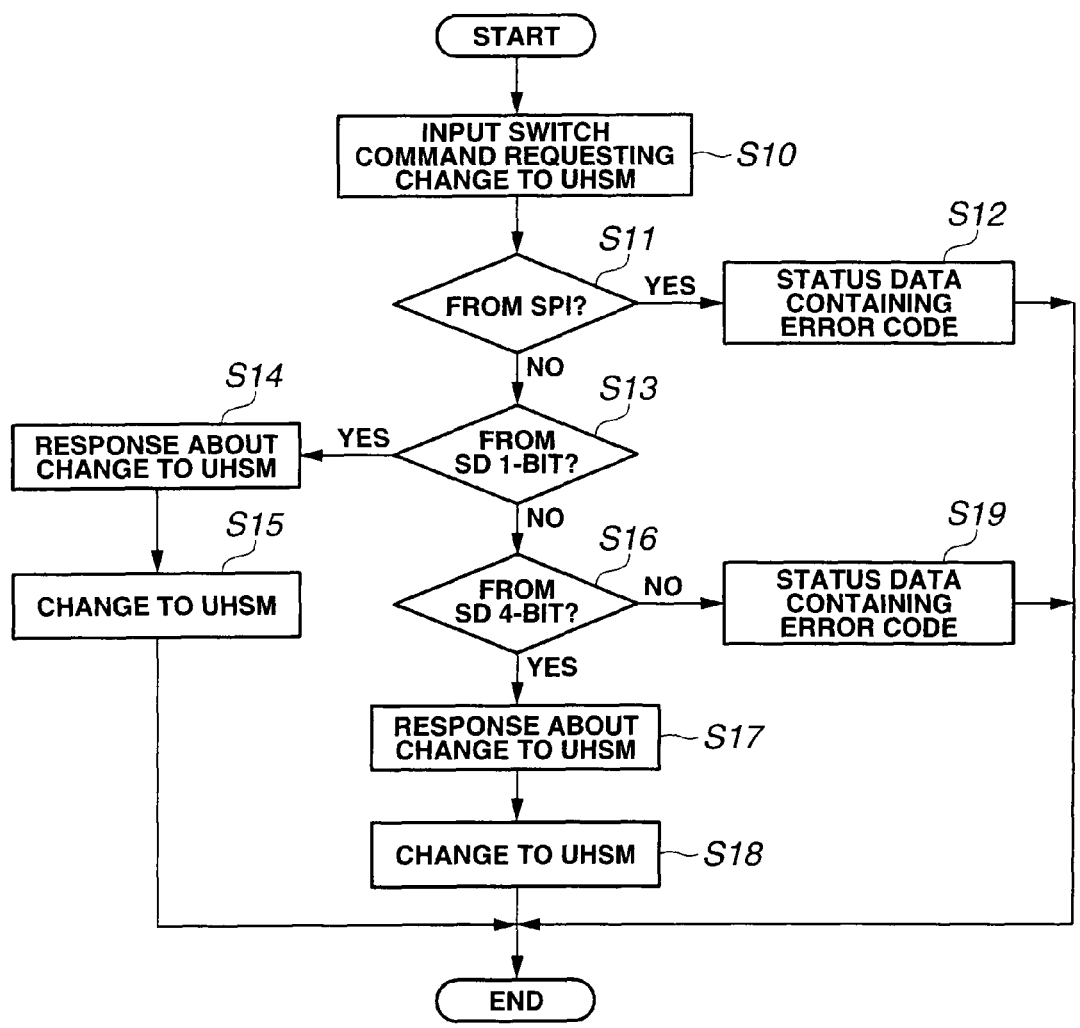
FIG. 11 is a flowchart illustrating a flow of operations performed by a transfer mode control unit according to a second embodiment.

FIG. 11 is a flowchart illustrating a flow of operations performed by the transfer mode control unit 18B of the memory card 100B. The flow of bus width mode control operation of the transfer mode control unit 18B in the memory card 100B during a change to UHSM will be described below with reference to FIG. 11

<Step S10>

Description will be given of a flow of bus width mode control operation performed by the transfer mode control unit 18B when a switch command is issued by the host device 200, requesting a change to UHSM (SD 4-bit).

<Steps S11 and S12>

If the memory card 100B is currently in SPI mode, in Step S12, the transfer mode control unit 18B transmits status data to the host device 200 in SPI mode, the status data containing an error code which indicates that no change to UHSM has been made (outputting an error code).

<Steps S13, S14, and S15>

If the memory card 100B is currently in SD 1-bit mode, in Step S14, the transfer mode control unit 18B transmits a response (status data) to the host device 200 in SD 1-bit mode, indicating that the transfer mode is changed to UHSM. Once the response has been sent out, the transfer mode control unit 18B changes the transfer mode to UHSM in Step S15 (changing a current transfer mode).

In the above steps, the bus width change and transfer rate change are controlled from the host device 200 using a single command. Also, the response (status data) to the switch command is returned in 1-bit mode and the memory card 100B enters a 4-bit mode beginning with a next command. This makes it clear when to change the bus width on a command by command basis and makes it easy for the host device 200 to control bus width changes.

<Steps S16, S17, and S18>

If the memory card 100B is currently in SD 4-bit mode, in Step S17, the transfer mode control unit 18B transmits a response to the host device 200 in SD 4-bit mode, indicating that the transfer mode is changed to UHSM. In Step S18, the transfer mode control unit 18B changes the transfer mode to UHSM (changing a current transfer mode).

<Step S19>

If the switch command does not fit any one of the above cases, the transfer mode control unit 18B transmits status data containing an error code to the host device 200 in the current mode (outputting an error code).

With the memory card 100B according to the present embodiment, even if a command to change to the 1-bit bus width transfer mode not supported by the memory card 100B is issued by the host device 200, the transfer mode control unit 18B changes the transfer mode to the 4-bit bus width mode supported by the memory card 100B, enabling high processing speed and easy control from the host device, and thereby adding to convenience.

Also, the response to the switch command is returned in a 1-bit mode and the memory card 100B enters a 4-bit mode beginning with a next command. This makes it clear to the host when to change the bus width on a command by command basis and makes it easy for the host controller to control bus width changes.

On the memory card 100B, a change from UHSM to NSM or HSM is made by a switch command from the host device 200. In this case, after the change to NSM or HSM, the memory card 100B remains in the 4-bit bus width mode.

Third Embodiment

Figure 12:
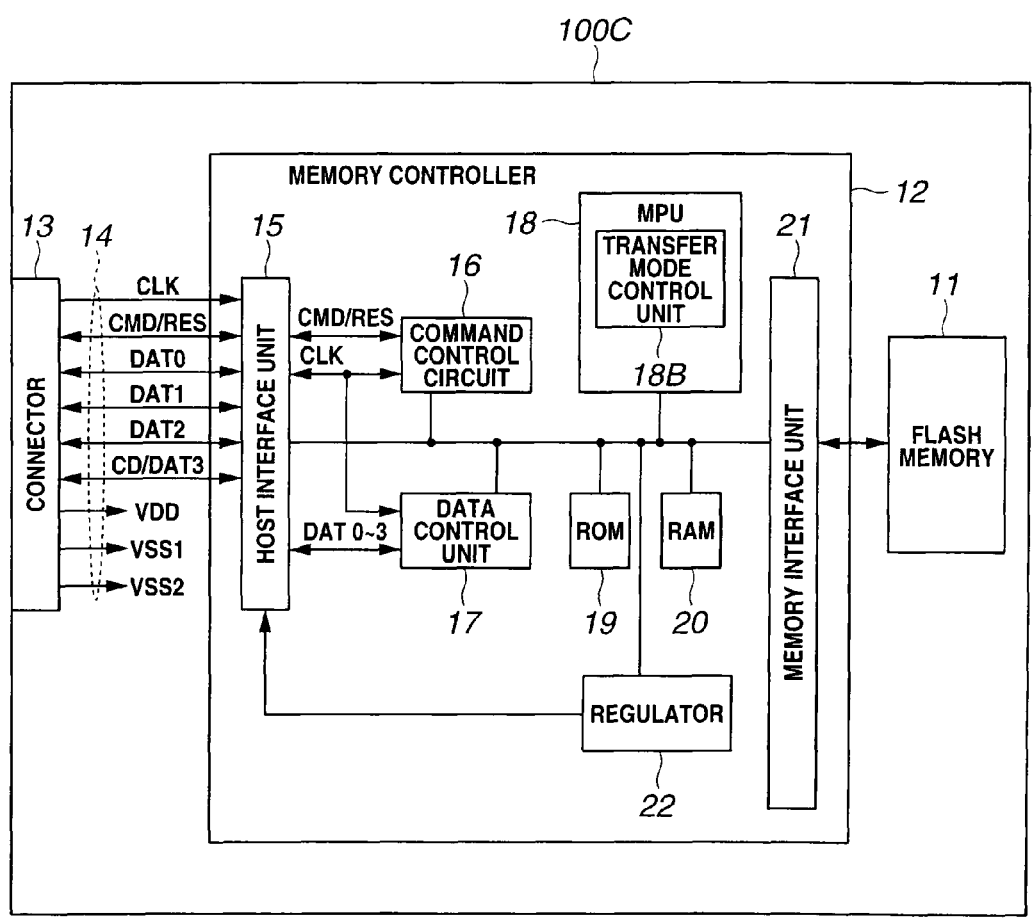
FIG. 12 is a block diagram showing a configuration of a memory card according to a third embodiment.
Figure 13:
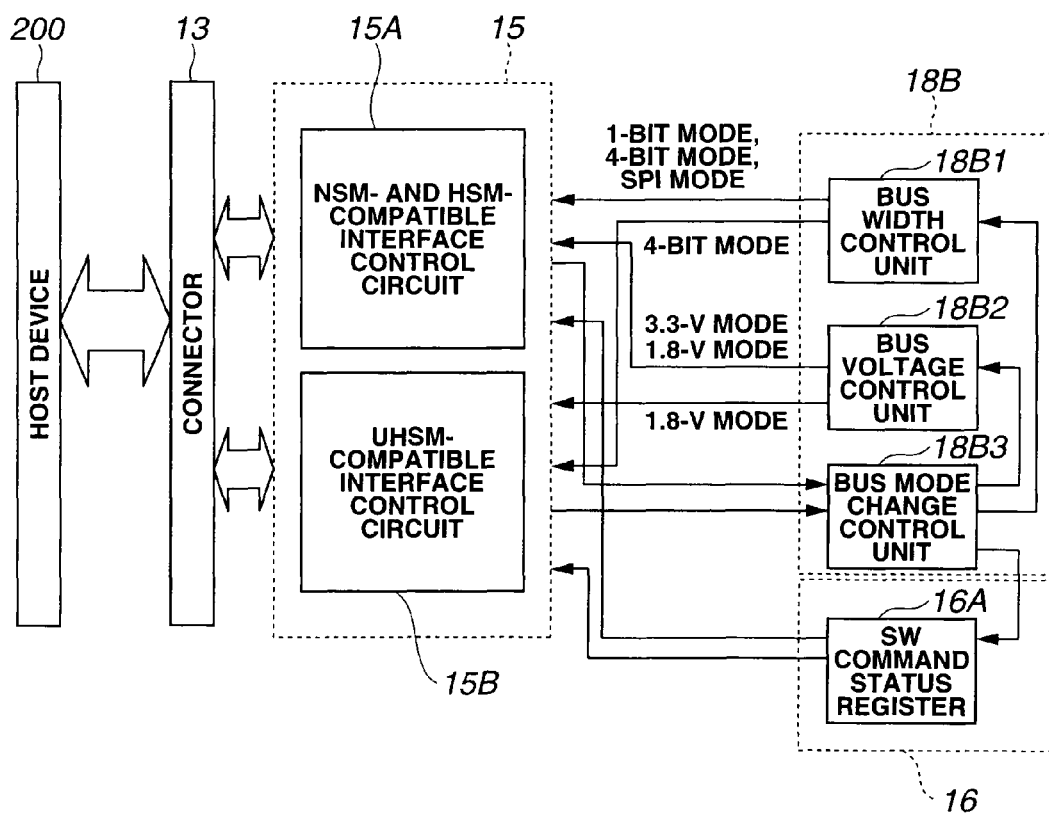
FIG. 13 is a block diagram showing a configuration of a transfer mode control unit 18B and the like of the memory card according to the third embodiment.

Next, a memory card 100C according to a third embodiment of the present invention will be described with reference to FIGS. 12 and 13. FIG. 12 is a block diagram showing a configuration of the memory card 100C according to the present embodiment and FIG. 13 is a block diagram showing a configuration of a transfer mode control unit 18B and the like. Configuration and the like of the memory card 100C are similar to those of the memory card 100 according to the first embodiment. Thus, the same components as the first embodiment will be denoted by the same reference numerals as the corresponding components in the first embodiment, and description thereof will be omitted.

The memory card 100C uses the single-edge mode instead of the double-edge mode even in UHSM. However, the memory card 100C supports UHSM, for example, by increasing the transfer clock frequency to 100 MHz compared to 50 MHz in HSM.

The command control circuit 16, which transfers data in sync with edges of the clock signal CLK, can double the transfer rate by doubling the transfer clock frequency and quadruple the transfer rate by quadrupling the transfer clock frequency. However, as described above, increases in the transfer clock frequency can result in the need to take measures for EMI as well as increases in power consumption of the memory card.

To deal with this, as shown in FIG. 12, the memory card 100C has a regulator 22 to adjust voltage of a transfer signal. The regulator 22 supplies different drive voltages to the host interface unit 15 in transfer modes which differ in transfer clock frequency.

Next, a configuration of the transfer mode control unit 18B of the memory card 100C will be described in more detail with reference to FIG. 13. As shown in FIG. 13, the transfer mode control unit 18B includes a bus width control unit 18B1, a bus voltage control unit 18B2, and a bus mode change control unit 18B3 while the command control circuit 16 includes a switch command status register 16A. On the other hand, the host interface unit 15 includes NSM- and HSM-compatible interface control circuit 15A and UHSM-compatible interface control circuit 15B.

Upon receiving a switch command from the host device 200 via a bus (receiving a transfer mode change command), the bus mode change control unit 18B3 of the transfer mode control unit 18B controls settings of the bus width control unit 18B1, the bus voltage control unit 18B2, the NSM- and HSM-compatible interface control circuit 15A, the UHSM-compatible interface control circuit 15B, and the like. Then, the bus voltage control unit 18B2 controls the drive voltage via the regulator 22. Also, the bus mode change control unit 18B3 sends a response to the host interface unit 15 by setting a flag corresponding to the switch command on the switch command status register 16A.

FIGS. 14A and 14B show command protocols used to issue switch commands.

As shown in FIG. 14A, a 24-bit command parameter is issued as a parameter to the switch command. Consequently, bus access mode and bus voltage mode are specified separately in respective parameter fields. The memory card 100C changes operation mode in response to the command and command parameter.

The memory card 100C outputs reception status of the switch command as 512-bit status data to the host device 200.

FIG. 14B shows status data indicated in response to a switch command. In the status data, the bus access mode and bus voltage mode for reception of a next command are indicated to the host device 200 in the respective fields.

For example, when a change to UHSM is ordered by the host device 200, if the memory card 100C can be changed to UHSM, status resulting from the change is indicated in the status data. If the memory card 100C cannot be changed to UHSM, status data to that effect is transmitted from the memory card 100C to the host device 200.

Incidentally, as shown in FIGS. 15A and 15B, a command protocol used when a switch command is issued may be such that the bus access mode and bus voltage mode will be defined in the same field.

The memory card 100C is capable of data transfer not only in a standard 3.3-V IO mode (first drive voltage mode) supported by many host devices, but also in a 1.8-V IO mode (second drive voltage mode) lower in voltage. In a transfer mode with a higher transfer clock frequency, the bus voltage control unit 18B2 controls the regulator 22 so as to supply a lower drive voltage to the host interface unit 15.

Transfer modes of the memory card 100C and the process of changing the drive voltage supplied by the regulator 22 will be described below.

(1) In an initial state after initialization, the memory card 100C is in NSM 3.3-V IO mode (first transfer clock mode+first drive voltage mode).

(2) When the memory card 100C is in 3.3-V IO mode and in NSM or HSM, if a switch command is issued by the host device 200 instructing the memory card 100C to enter NSM or HSM and change from 3.3-V IO mode to 1.8-V IO mode (receiving a transfer mode change command), the memory card 100C returns status data to the host device 200 in 3.3-V IO mode, reporting a successful change to the 1.8-V IO mode. Then, the regulator 22 changes the drive voltage to 1.8 V (changing a current transfer mode) and subsequently the memory card 100C transmits and receives data in 1.8-V IO mode.

(3) When the memory card 100C is in 1.8-V IO mode and in NSM or HSM, if a switch command is issued by the host device 200 instructing the memory card 100C to enter NSM or HSM and change from 1.8-V IO mode to 3.3-V IO mode (receiving a transfer mode change command), the memory card 100C returns status data to the host device 200 in 1.8-V IO mode, reporting a successful change to the 3.3-V IO mode. Then, the regulator 22 changes the drive voltage to 3.3 V (changing a current transfer mode) and subsequently the memory card 100C transmits and receives data in 3.3-V IO mode.

(4) When the memory card 100C is in 3.3-V IO mode and in NSM or HSM (first transfer clock mode+first drive voltage mode), if a switch command is issued by the host device 200 instructing the memory card 100C to change from NSM or HSM to UHSM as well as from 3.3-V IO mode to 1.8-V IO mode (second transfer clock mode+second drive voltage mode) (receiving a transfer mode change command), on the side of the memory card 100C, the transfer mode control unit 18B changes the transfer mode and the regulator 22 changes to 1.8-V IO mode (second transfer clock mode+second drive voltage mode), as described above. That is, after transmitting status data in response to the switch command in the old mode, the memory card 100C changes to the UHSM 1.8-V IO mode and subsequently transmits and receives data in the UHSM 1.8-V IO mode.

(5) When the memory card 100C is in 3.3-V IO mode and in NSM or HSM, if a switch command is issued by the host device 200 instructing the memory card 100C to change to UHSM and 3.3-V IO mode, the memory card 100C remains in the current mode by returning NON-CHANGEABLE status.

(6) When the memory card 100C is in 1.8-V IO mode and in NSM or HSM, if a switch command is issued by the host device 200 instructing the memory card 100C to change to UHSM (receiving a transfer mode change command), the memory card 100C makes the transfer mode control unit 18B change the transfer mode to UHSM and subsequently the memory card 100C transmits and receives data in the UHSM 1.8-V IO mode, as described above.

(7) When the memory card 100C is in UHSM 1.8-V IO mode, if a switch command is issued by the host device 200 instructing the memory card 100C to change to 3.3-V IO mode (receiving a transfer mode change command), the memory card 100C remains in the current mode by returning NON-CHANGEABLE status data (outputting an error code). This is because, in UHSM, the memory card 100C supports only a low voltage mode, i.e., the 1.8-V IO mode. Reception of the status data allows the host device 200 to take measures such as changing to another transfer mode, thereby avoiding errors such as a freeze-up.

(8) When the memory card 100C is in UHSM 1.8-V IO mode, if a switch command is issued by the host device 200 instructing the memory card 100C to enter NSM or HSM as well as 3.3-V IO mode or 1.8-V IO mode (receiving a transfer mode change command), the memory card 100C makes the transfer mode control unit 18B change the transfer mode and enters the 3.3-V IO mode or 1.8-V IO mode whichever is specified, as described above (changing a current transfer mode). The memory card 100C returns status data to the host device 200 in the old mode, reporting a successful change to NSM or HSM. Subsequently, the memory card 100C transmits and receives data in the new mode.

With the memory card 100C, in a transfer mode with a higher transfer clock frequency, the regulator 22 supplies a lower drive voltage to the host interface unit 15. Consequently, in addition to the advantages of the memory card 100 according to the first embodiment, the memory card 100C offers the advantage of low noise and low power consumption even in transfer modes with high transfer clock frequency.

Incidentally, the memory card 100C may use a data transfer mode with a higher transfer rate by combining UHSM with 100 MHz, double-edge mode, and 1.8-V IO mode.

Variation of Third Embodiment

Next, a memory card 100D according to a variation of the third embodiment of the present invention will be described. Configuration and the like of the memory card 100D are similar to those of the memory card 100C according to the third embodiment. Thus, the same components as the third embodiment will be denoted by the same reference numerals as the corresponding components in the third embodiment, and description thereof will be omitted.

To simplify memory card configuration and the like, the memory card 100D supports only the low-voltage 1.8-V IO mode in UHSM, and only the standard 3.3-V IO mode in NSM and HSM.

Transfer modes of the memory card 100D and the process of changing the drive voltage supplied by the regulator 22 will be described below.

(1) In an initial state after initialization, the memory card 100D is in NSM 3.3-V IO mode.

(2) When the memory card 100D is in 3.3-V IO mode and in NSM or HSM, if a switch command is issued by the host device 200 instructing the memory card 100D to change to UHSM (receiving a transfer mode change command), on the side of the memory card 100D, the transfer mode control unit 18B changes the transfer mode, the regulator 22 changes the drive voltage to 1.8 V, and the memory card 100D enters UHSM, as described above (changing a current transfer mode).

In response to the switch command, the memory card 100D transmits CHANGE COMPLETE status in the old mode, enters the UHSM 1.8-V IO mode, and subsequently transmits and receives data in the UHSM 1.8-V IO mode.

(3) When the memory card 100D is in UHSM 1.8-V IO mode, if a switch command is issued by the host device 200 instructing the memory card 100D to enter NSM or HSM (receiving a transfer mode change command), on the side of the memory card 100D, the transfer mode control unit 18B changes the transfer mode, the regulator 22 changes the drive voltage to 3.3 V, and the memory card 100D enters NSM or HSM, as described above (changing a current transfer mode).

In response to the switch command, the memory card 100D transmits CHANGE COMPLETE status in the old mode, enters the 3.3-V IO mode and NSM or HSM, and subsequently transmits and receives data in the 3.3-V IO mode and NSM or HSM.

(4) In any of UHSM, NSM, and HSM, in response to a switch command to change only the drive voltage using the regulator 22 (receiving a transfer mode change command), the memory card 100D remains in the current mode by returning status data containing a NON-CHANGEABLE error code (outputting an error code).

Incidentally, since in NSM and HSM, the memory card 100D supports only the 3.3-V IO mode, the switch command parameter field for bus voltage mode described above is unnecessary.

In addition to the advantages of the memory card 100C according to the third embodiment, the memory card 100D according to the present embodiment offers the advantages of being easy to control and avoiding increases in complexity and size.

The present embodiment has been described by taking an SD Memory Card (registered trademark) as an example, but the present embodiment is also applicable to other types of memory card, memory devices, internal memories, and the like as long as the semiconductor memory devices have a similar bus structure, offering operating advantages similar to those of the memory card 100 and the like. Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A semiconductor memory device capable of connecting to a host device, comprising:
    a semiconductor memory unit;
    a host interface unit configured to perform data transfer with the host device and compatible with a plurality of transfer modes obtained by combining one of a plurality of drive voltage modes and one of a plurality of transfer clock modes;
    a transfer mode control unit configured to output an error code to the host device if the host device inputs a transfer mode change command instructing the semiconductor memory device to change a current transfer mode in a first transfer clock mode and a first drive voltage mode to a second transfer clock mode not supported by the host interface unit in the first drive voltage mode; wherein
    each transfer mode is a combination of one of the plurality of drive voltage modes, one of the plurality of transfer clock modes, and one of a plurality of transfer bus width modes, and
    the transfer mode control unit changes a current transfer mode to a combination of a second transfer bus width mode and a second transfer clock mode supported by the host interface unit upon inputting from the host device of a transfer mode change command instructing the semiconductor memory device to change to the second transfer clock mode, which is not supported by the host interface unit in a first transfer bus width mode, when the host interface unit is in the first transfer bus width mode and the first transfer clock mode.

2. A semiconductor memory device capable of connecting to a host device, comprising:
    a semiconductor memory unit;
    a host interface unit configured to perform data transfer with the host device and compatible with a plurality of transfer modes obtained by combining one of a plurality of drive voltage modes and one of a plurality of transfer clock modes; and
    a transfer mode control unit configured change a current transfer mode from a first transfer clock mode and a first drive voltage mode to a second transfer clock mode and a second drive voltage mode upon input from the host device of a transfer mode change command instructing to change the current transfer mode to the second drive voltage mode, which is not supported by the host interface unit in the first transfer clock mode, and configured to output a status code indicating completion of the change of current transfer mode to the combination of the second drive voltage modes and the second transfer clock mode.

3. The semiconductor memory device according to claim 2, wherein drive voltage of the second drive voltage mode is lower than drive voltage of the first drive voltage mode.

4. The semiconductor memory device according to claim 2, wherein drive voltage of the first drive voltage mode is 3.3V and drive voltage of the second drive voltage mode is 1.8V.

5. The semiconductor memory device according to claim 2, wherein the transfer mode is one of five transfer modes obtained by:

(1) combination of a transfer clock mode with a transfer clock frequency of 25 MHz and a drive voltage mode with a drive voltage of 3.3V;

(2) combination of a transfer clock mode with a transfer clock frequency of 50 MHz and a drive voltage mode with a drive voltage of 3.3V;

(3) combination of a transfer clock mode with a transfer clock frequency of 25 MHz and a drive voltage mode with a drive voltage of 1.8V;

(4) combination of a transfer clock mode with a transfer clock frequency of 50 MHz and a drive voltage mode with a drive voltage of 1.8V;

(5) combination of a transfer click mode with a transfer clock frequency of 100 MHz and a drive voltage mode with a drive voltage of 1.8V.

6. The semiconductor memory device according to claim 2, wherein
each transfer mode is a combination of one of the plurality of drive voltage modes, one of the plurality of transfer clock modes, and one of a plurality of transfer bus width modes, and
the transfer mode control unit changes a current transfer mode from a first transfer bus width mode and a first transfer clock mode to a second transfer bus width mode and a second transfer clock mode supported by the host interface unit if the host device inputs a transfer mode change command instructing to change to the second transfer clock mode, which is not supported by the host interface unit in the first transfer bus width mode, when the host interface unit is in the first transfer bus width mode and the first transfer clock mode.

7. A semiconductor memory device capable of connecting to a host device, comprising:
a semiconductor memory unit;
a host interface unit configured to perform data transfer with the host device and compatible with a plurality of transfer modes obtained by combining one of a plurality of drive voltage modes and one of a plurality of transfer clock modes and one of a plurality of transfer bus width modes; and
a transfer mode control unit,
configured to output an error code to the host device if the host device inputs a transfer mode change command instructing the semiconductor memory device to change a current transfer mode in a first transfer clock mode and a first drive voltage mode to a second transfer clock mode which is not supported by the host interface unit in the first drive voltage mode, and configured change a current transfer mode from a first transfer clock mode and a first drive voltage mode to a second transfer clock mode and a second drive voltage mode upon input from the host device of a transfer mode change command instructing to change the current transfer mode to the second drive voltage mode, which is not supported by the host interface unit in the first transfer clock mode, and configured to output a status code indicating completion of the change of current transfer mode to the combination of the second drive voltage modes and the second transfer clock mode.

8. The semiconductor memory device according to claim 7, wherein drive voltage of the second drive voltage mode is lower than drive voltage of the first drive voltage mode.

9. The semiconductor memory device according to claim 7, wherein drive voltage of the first drive voltage mode is 3.3V and drive voltage of the second drive voltage mode is 1.8V.

10. The semiconductor memory device according to claim 7, wherein the transfer mode is one of five transfer modes obtained by:

(1) combination of a transfer clock mode with a transfer clock frequency of 25 MHz and a drive voltage mode with a drive voltage of 3.3V;

(2) combination of a transfer clock mode with a transfer clock frequency of 50 MHz and a drive voltage mode with a drive voltage of 3.3V;

(3) combination of a transfer clock mode with a transfer clock frequency of 25 MHz and a drive voltage mode with a drive voltage of 1.8V;

(4) combination of a transfer clock mode with a transfer clock frequency of 50 MHz and a drive voltage mode with a drive voltage of 1.8V;

(5) combination of a transfer click mode with a transfer clock frequency of 100 MHz and a drive voltage mode with a drive voltage of 1.8V.

11. The semiconductor memory device according to claim 7, wherein
the transfer mode control unit changes a current transfer mode from a first transfer bus width mode and a first transfer clock mode to a second transfer bus width mode and a second transfer clock mode supported by the host interface unit if the host device inputs a transfer mode change command instructing to change to the second transfer clock mode, which is not supported by the host interface unit in the first transfer bus width mode, when the host interface unit is in the first transfer bus width mode and the first transfer clock mode.

* * * * *